Oct. 12, 1954

R. L. McILVAINE 2,691,423

DUST COLLECTOR

Filed June 14, 1951

Inventor:
Robert L. McIlvaine
by [signature] Attys

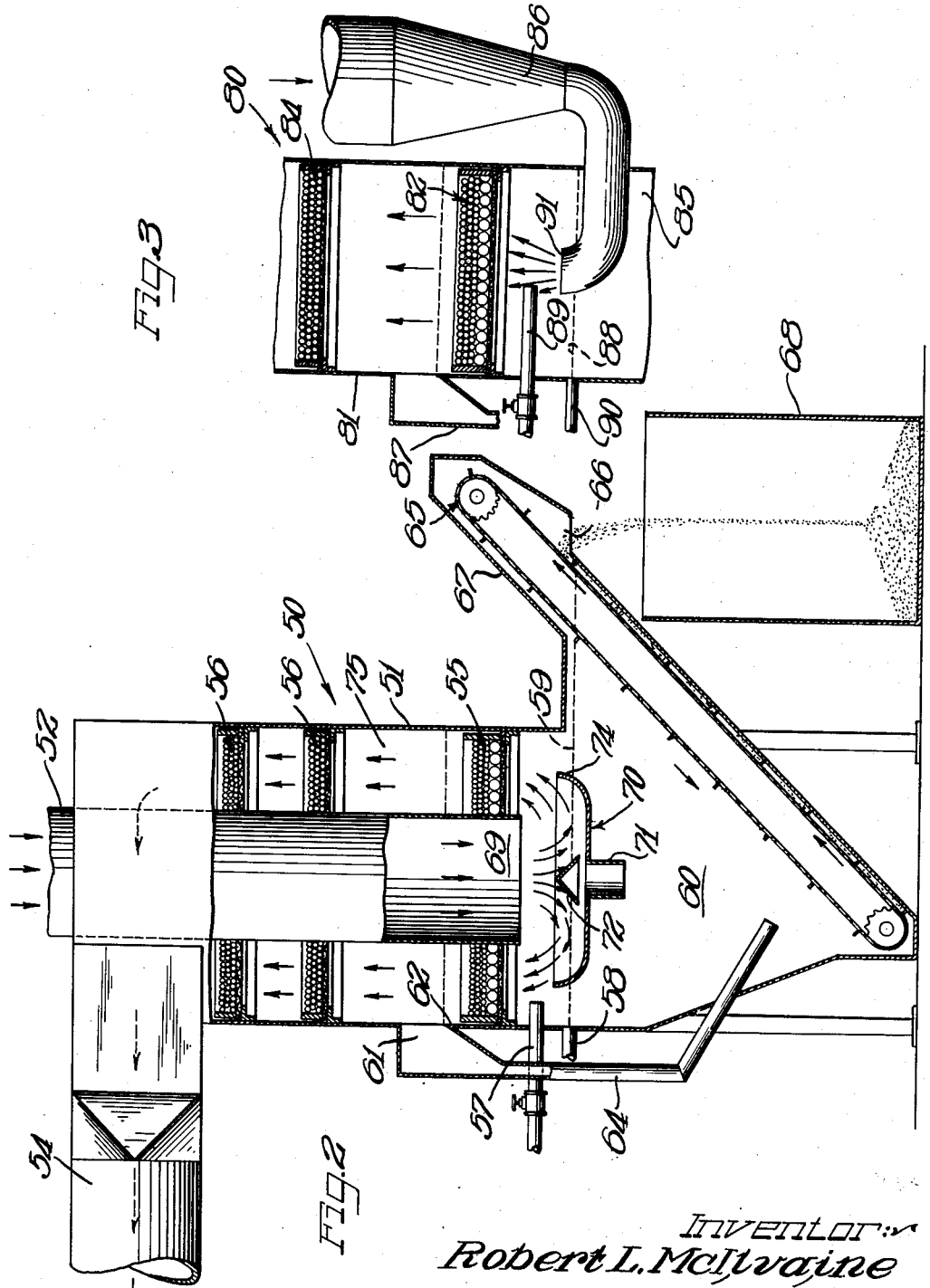

Patented Oct. 12, 1954

2,691,423

UNITED STATES PATENT OFFICE 2,691,423

DUST COLLECTOR

Robert L. McIlvaine, Glencoe, Ill., assignor, by mesne assignments, to Herbert Simpson Corporation, Chicago, Ill., a corporation of Illinois Application June 14, 1951, Serial No. 231,501

7 Claims. (Cl. 183—10)

This invention relates to apparatus for removing dust or the like from a gas such as air. More particularly, the invention relates to dust collector apparatus in which liquid droplets are entrained in the dust-laden gas before the gas is passed through the filtering means.

In most dust collector devices of the prior art the dust-laden air to be cleansed is passed through a filter bed or beds while liquid such as water is introduced above or within the bed for wetting the filtering elements and for washing away the collected dust or sediment. In such an arrangement the water is constantly escaping down through the filter bed into a sump below where the heavy solids are settled out. It has been found that as the volume of air passing through the filter bed is increased, it becomes increasingly difficult to pass sufficient water down through the bed against the upward air flow in order to keep the bed clean. However, it has been found that the separation efficiency of the collector increases with the air velocity through the bed up to air flows substantially higher than those which can be utilized with inventions or arrangements of the prior art.

As a consequence, the dust collector of the present invention is constructed so that the water is introduced into the dust-laden air below the filter bed and is permitted to travel upwardly with the air flow. A turbulent area consisting of dirty water is formed above the filter bed, and the height of this turbulent area is controlled by a dam with a drain return to the sump. With this arrangement, the overall pressure drop through the dust collector remains substantially constant with a constant air flow, and the flow of air can be brought up to the most efficient flow since sufficient water is constantly provided for keeping the bed clean.

The three different species of the invention shown in the drawings are concerned with various different methods for introducing dust-laden air below the filter bed and for entraining the water in the air for impingement on the lower surface of the first bed.

It is an object of the present invention to provide an improved dust collector.

An important object of the invention is to provide an efficient method for separating dust from a gas.

Another object of the invention is to provide an assembly for removing dust particles from a gas in which a cleansing liquid is entrained in the dust-laden gas before the same is passed through the filtering means.

A further object of the invention is to provide an improved dust collector including means for entraining liquid in the dust laden gas before the same is passed through a filter bed and including means for maintaining a given height of turbulent area above the filter bed.

An additional object is to provide an improved method of separating dust from a gas in which a cleansing liquid is entrained in the dust-laden gas before the same is passed through filtering means.

Still another object of the present invention is to provide a dust collecting structure in which dust-laden gas in introduced into a lower casing portion containing a supply of liquid with means therein for entraining a portion of the liquid in the gas before the same passes through a filter bed and including means for maintaining predetermined liquid levels for the liquid supply and for a turbulent area formed above the filter bed.

A still further object of the invention is to provide a dust collector including a plurality of filter beds with means for introducing dust-laden gas below the lowermost filter bed and for entraining liquid in the gas before the same is passed through the various filter beds, said dust collector including turbulent level maintaining means above the lowermost filter bed.

A feature of the invention is the provision of a sludge conveyor for removing accumulated dust or sediment from the dust-collecting sump.

Another feature is the provision of an air inlet arranged for entraining a portion of the liquid in the sump as the dust-laden air is introduced below the filtering means.

A further feature of the invention is the provision of means for maintaining constant the liquid levels above the first filter bed and in the sump, respectively.

Other objects, features and advantages of the present invention will be apparent from the following detailed description of three embodiments, by way of preferred examples only, taken in conjunction with the accompanying drawings.

On the drawings:

Figure 2 is a view similar to Figure 1 but illustrating a second embodiment of the invention; and Figure 3 is a fragmentary sectional view, with parts in elevation, of a portion of a third embodiment of the invention.

As shown on the drawings:

Figure 1:
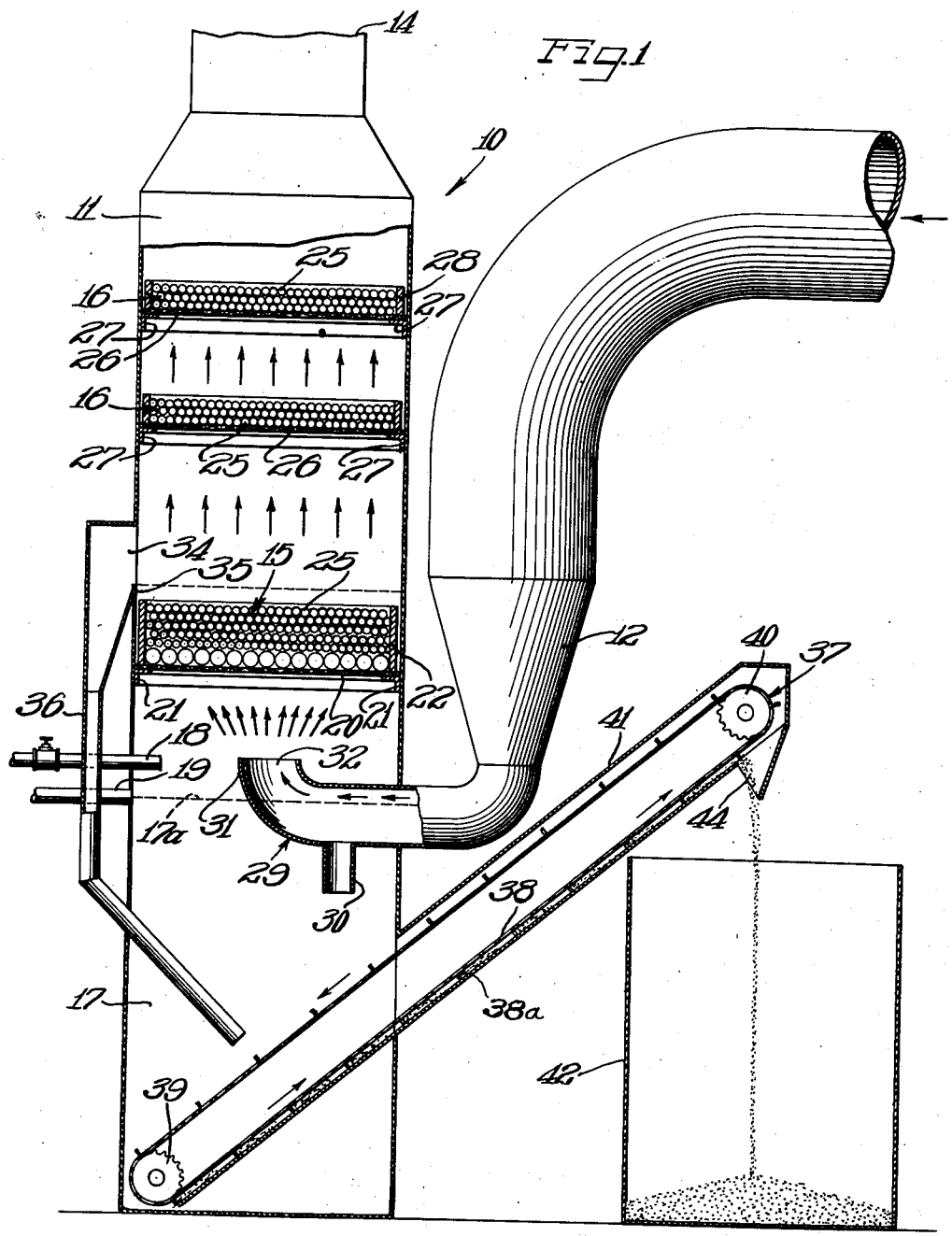
Figure 1 is a fragmentary sectional view of one embodiment of the invention with some portions shown in elevation.

A particularly efficient method of dust separation is provided by this invention and is per-formed by the dust collectors illustrated in the three figures. This method comprises first entraining liquid droplets in a dust laden gas, and then passing the gas and the liquid droplets in the same direction through tortuous filter channels such as those formed in a devious-pathed filter so that the dust particles will impinge upon the wetted filtering elements and will be continuously entrapped and washed upwardly to form a turbulent area of dirty water above the filter. A given level of the turbulent area is maintained and the excess dirty liquid is directed to a sump. Hence, a constant overall pressure drop is maintained for a given air flow. The pressure drop is additionally prevented from becoming excessive by introducing the dust-laden air below the filtering means but above a liquid level in the sump.

In Figure 1 a dust collecting apparatus is generally designated by the reference numeral 10. The dust collector comprises a housing 11, an inlet conduit 12 for a dust-laden gas such as air, an outlet 14 for clean air, a primary filter bed 15 and a plurality of secondary filter beds 16, with the filter beds arranged in series between the inlet and outlet. A sump 17 is provided in the casing below the primary filter bed and contains a cleansing liquid such as water.

In order to maintain a predetermined water level 17a below the filter bed 15, a water inlet pipe 18 and a drain 19 are provided.

The primary filter bed 15 preferably comprises a foraminous tray 20, formed of wire mesh or the like, and supported on angles 21 which have one leg affixed to the inner walls of the casing 11 as by welding. Upstanding retainer sides 22 are provided above the tray 20 along the outer edge portions thereof. A plurality of discrete filter elements are supported on the tray between the sides 22 and preferably comprise one layer of large spheroids 24 and several layers of smaller spheroids 25 with the larger spheroids forming the bottom layer resting on the tray 20. The spheroids are preferably formed of non-corrosive material such as glass or the like.

The filter beds 16 may be of similar construction with foraminous trays 26, support angles 27 but with somewhat shorter retaining sides 28. Only a few layers of the smaller spheroids 25 need ordinarily be provided for these auxiliary filter beds.

According to the present invention means are provided for entraining droplets of water from the sump 17 into dust-laden air supplied by the inlet conduit 12 and for directing the dust-and-water-laden air upwardly against the filter bed 15. In the present instance such means comprise a liquid supply and air inlet structure 29 in the form of an extension of the conduit 12. The supply structure 29 includes a short downwardly-directed water inlet pipe 30 with the lower portion of the structure and the pipe 30 below the liquid level. The upper portion of the supply structure is above the liquid level so that the structure presents an air flow path which is restricted by the water disposed in the lower portion of the structure. An upturned deflector portion 31 provides an inlet 32 and directs the dust-and-water-laden air upwardly against the under surface of the filter bed 15.

Because of the restricted flow path through the liquid supply structure 29, the air flow will be turbulent and a substantial amount of water in the form of droplets will become entrained in the dust-laden air. A substantial amount of the dust will cling to the water droplets, and when the air-dust-water mixture impinges on the spheroids 24 and 25, the same will become wetted so that the previously wetted dust will cling to the spheroids. Since devious flow paths are provided between the various spheroids, the inertia of the unwetted dust particles will cause this dust to impinge upon the spheroids and to cling thereto. However, the upwardly traveling water droplets continuously wash off and carry upwardly the wetted dust to form a turbulent area of dirty water above the filter bed 15. In this manner almost all of the dust particles will be wetted and will remain behind in the dirty water above the filter 15 while the air will continue to travel upwardly.

The auxiliary filter beds 16 will serve to cleanse the air of the remaining dust particles by coaction of the remaining water droplets with the spheroids 25 in somewhat the same manner as the operation of the filter bed 15. Hence, the air passing through the outlet 14 will be substantially completely free of dust particles.

In order to induce the proper amount of air flow through the casing, an air pump (not shown) such as a centrifugal fan or blower may be provided in either the inlet 12 or the outlet 14 but preferably in the outlet.

The present invention includes means for controlling the height of the turbulent dirty water area above the primary filter bed 15 in order to insure consistent performance of the dust collector and to prevent an unnecessarily high pressure drop therethrough. In the present instance such means comprise a drain aperture 34 with a dam 35 of a predetermined height defining the lower edge of the aperture. An overflow drain pipe 36 connects the overflow aperture 34 with the sump 17 so that dirty water overflowing the dam 35 will be conducted back to the sump where the dust particles can settle out to form a sediment or sludge in the bottom portion of the sump.

For removing the collected sediment from the bottom portion of the sump, a flight type sludge conveyor 37 may be provided. As shown herein the sludge conveyor comprises a continuous chain 38, with flights 38, as trained about a first sprocket 39 located in the bottom of the sump and a sprocket 40 located at the upper end portion of a conveyor casing extension 41 slanting outwardly and upwardly from the bottom portion of the casing 11. The upper portion of the extension 41 is located above the level of the water in the sump. The chain 38 travels in the direction of the arrows so that accumulated sediment will be scraped up by the flights and will travel upwardly out of the sump along the lower surface of the housing 41. An open top sludge container 42 is provided below an opening 44 formed underneath the sprocket 40. Hence, the sediment particles will fall from the conveyor as it reaches opening 44 into the sludge container in the manner indicated in the drawing.

In order to insure that the dirty water from the turbulent area above the filter bed 15 is dumped into the sump so that the heavier particles will be in position for quick removal by the sludge conveyor, the lower end of the drain pipe 36 is disposed adjacent the upper surface of the belt 38.

In Figure 2 a second embodiment of the dust collector is generally designated by the reference numeral 50. The dust collector 50 comprises a casing 51, an air inlet conduit 52 which extends downwardly in the center of the casing and an outlet conduit 54. A primary filter bed 55 and a plurality of secondary filter beds 56, similar to the filter beds 15 and 16 and secured in the casing in substantially the same manner, have the inlet conduit 52 extending through the central portions thereof. A liquid inlet pipe 57 and a liquid outlet pipe 58 are provided for maintaining a liquid level 59 in a sump 60. An overflow aperture 61, an overflow dam 62 and an overflow drain 64 are incorporated for maintaining the proper height of the turbulent area above the primary filter bed 55 and for directing the overflowing dirty water back to the sump 60. In order to remove contaminated sediment from the sump 60 a sludge conveyor 65 is arranged for conveying separated sediment upwardly and dropping the same through an opening 66 in a conveyor housing portion 67, into a sludge container 68 in the manner described in connection with Figure 1.

For discharging dust-laden air into the interior of the casing 51, the inlet conduit 52 provides an inlet 69 at its lower end below the primary filter bed 55 and above the water level 59. In order to entrain water in the incoming air and to direct the mixture upwardly against the lower surface of the filter 55, a liquid supply structure 70 is provided. In this instance the supply structure may comprise a saucer-like baffle having a central downwardly extending inlet pipe 71, a central conical deflector 72 disposed in spaced relation above the upper end of the pipe 71 and an annular upturned deflector edge portion 74.

It will be seen that the air will follow a path indicated by the arrows and will impinge upon the water in the liquid supply portion to entrain some of the water in the form of droplets with the resultant mixture being deflected upwardly by the deflector portion 74 against the lower surface of the filter bed 55. The air will travel upwardly through the filter beds 55 and 56 in a roughly annular casing section 75 afforded between the interior walls of the casing 51 and the exterior of the conduit 52. It is readily apparent that the filtering process is the same as described in connection with Figure 1.

In the third embodiment illustrated in Figure 3, a dust collector is generally designated by the reference numeral 80. This dust collector comprises a casing 81, a primary filter bed 82, one or more secondary filter beds 84, a liquid containing sump 85, an air inlet conduit 86 and an air outlet (not shown). Overflow control means 87, similar to the means described in connection with the previous two figures, are incorporated for maintaining a predetermined height of turbulent area above the filter bed 82. For maintaining a predetermined level of water 88 in the sump 85, an inlet pipe 89 and an outlet pipe 90 are provided.

For entraining water in the dust-laden air entering the casing 81, the water inlet pipe 89 is extended inwardly so that its inward open end overlies an upturned end portion 91 of the conduit 86 with the end portion 91 opening above the water level 88 and below the primary filter bed 82. Thus, it will be seen that the water is directed into the upwardly moving dust-laden air to become entrained therein and will be carried upwardly with the air against the lower surface of the filter bed 82. The filtering process continues on in the same manner as described in connection with Figure 1 with cleansed air being discharged at the dust collector outlet.

For carrying away accumulated sediment in the embodiment illustrated in Figure 3, a sludge conveyor system (not shown) similar to that shown in the previous figures may be employed.

Air pumping means (not shown) are preferably provided in the outlet duct systems of the two embodiments of the dust collector illustrated in Figures 2 and 3 in order to induce the required air flow through the dust collectors.

It will be understood that the invention is not to be limited to the particular filtering means illustrated since satisfactory results can be obtained with other devious-pathed filters.

From the above description it will be readily seen that the present invention provides an improved method and apparatus for removing dust particles from a gas stream. The filtering means are kept clean as the process continues so that, under ordinary conditions, the dust collector units of the present invention will operate for long periods of time without necessity for shutdown. No auxiliary liquid pumping means and piping therefor are required for wetting and cleaning the filter bed. The air flow capacity of the dust collector units is greatly increased per square foot of filter bed area since it is not necessary for the cleansing liquid to travel in a direction opposite to that of the flow of air. The increased air flow results in a substantially increased separation efficiency. In addition, no elaborate water flow control means are required.

In order to more or less uniformly impinge the air and water mixture over the filter bed area, it should be noted that a plurality of the air inlet and water entrainment means shown in the drawings can be utilized in dust collector units of larger size.

It will be understood that modifications and variations may be effected without departing from the scope of the novel concepts of the present invention.

I claim as my invention:

1. In a dust collector including a casing containing a liquid supply and a filter bed, means maintaining a given liquid level below said filter bed, a saucer-like baffle secured in the casing and having a generally horizontal portion below the liquid level with a generally annular edge portion extending upwardly above the liquid level, said baffle including a depending inlet pipe secured in the central area of said horizontal portion, a deflector secured in spaced relation above said inlet pipe, a gas inlet conduit extending downwardly through said casing with an open end below said filter bed and centrally located in spaced relation above said baffle, said conduit directing dust-laden gas against the liquid in said baffle whereby a portion of the liquid is entrained in the gas and the dust-and-liquid-laden gas is directed upwardly against said filter bed by said annular edge portion, an outlet for clean gas on the other side of said filter bed whereby the gas passes through the bed and out the outlet and the dust and liquid in the bed are filtered out by the bed, and means maintaining a given level of dust-laden liquid above said filtering means.

2. In a dust collector including a casing containing a liquid supply and filtering means above the liquid supply, an inlet between said filtering means and said liquid supply for directing dust-laden gas upwardly, a liquid inlet for introducing liquid into the gas stream to entrain the liquid in the gas, an outlet for clean gas on the opposite side of said filtering means whereby the dust-and-liquid-laden gas passes through said filtering means and the dust and liquid in the gas are filtered out by the filtering means, a dam disposed at a predetermined height above the filtering means to maintain a given level of dust-laden liquid above the filtering means, and drain means conducting liquid overflowing said dam back to said supply.

3. In a dust collector including a liquid bath, a casing containing said liquid bath, a plurality of filter beds disposed in series in the casing above the liquid bath, a duct extending generally horizontally into said casing and having an upturned open end portion between the liquid bath and the lower filter bed, an increased diameter inlet conduit connected to said duct outside of said casing and directing dust-laden gas through the duct, a liquid supply pipe having an inlet opening between said duct opening and the lower filter bed for introducing liquid into the gas stream to entrain the liquid in the gas, an outlet for clean gas above said filter bed whereby the dust-and-liquid-laden gas passes successively through the beds and out the outlet and the dust and liquid in the gas are filtered out by the beds, a dam disposed between the two lowermost filter beds at a predetermined height above said lower bed to maintain a given level of dust-laden liquid above the lower bed, and drain means conducting liquid overflowing said dam back to said liquid bath.

4. In a dust collector system for removing dust particles from air by the entrapment of the particles in liquid, a liquid sump in which the liquid is maintained substantially at a given level, a lower filter bed spaced upwardly from said level, air inlet means for discharging dust laden air in said space between said level and said bed to entrain therein liquid prior to upward travel through said bed, means defining a dam for dirt entrained liquid above said bed, overflow means conducting liquid from said dam to said sump, means defining a turbulent area above said dam, and an upper filter bed above said area through which washed air travels upwardly for removing liquid therefrom and whereby said removed liquid can drain into said dam.

5. In a dust collector system for removing dust particles from air by the entrapment of the particles in liquid, a liquid sump in which the liquid is maintained substantially at a given level, a lower filter bed spaced upwardly from said level, air inlet means for discharging dust laden air in said space between said level and said bed to entrain therein liquid prior to upward travel through said bed, means defining a dam for dirt entrained liquid above said bed, overflow means conducting liquid from said dam to said sump, means defining a turbulent area above said dam, and an upper filter bed above said area through which washed air travels upwardly for removing liquid therefrom and whereby said removed liquid can drain into said dam, said filter beds each comprising substantially spheroid elements supported on a foraminous member the lowermost of which is disposed in close proximity to but spaced upwardly from said dust laden air discharge.

6. In a dust collector system for removing dust particles from air by the entrapment of the particles in liquid, a liquid sump in which the liquid is maintained substantially at a given level, a lower filter bed spaced upwardly from said level, air inlet means for discharging dust laden air in said space between said level and said bed to entrain therein liquid prior to upward travel through said bed, means defining a dam for dirt entrained liquid above said bed, overflow means conducting liquid from said dam to said sump, means defining a turbulent area above said dam, and an upper filter bed above said area through which washed air travels upwardly for removing liquid therefrom and whereby said removed liquid can drain into said dam, said dust laden air discharge being upturned in said space toward the underside of said lower filter bed for directing both air and liquid toward said lower filter bed.

7. In a dust collector system for removing dust particles from air by the entrapment of the particles in liquid, a liquid sump in which the liquid is maintained substantially at a given level, a lower filter bed spaced upwardly from said level, air inlet means for discharging dust laden air in said space between said level and said bed to entrain therein liquid prior to upward travel through said bed, means defining a dam for dirt entrained liquid above said bed, overflow means conducting liquid from said dam to said sump, means defining a turbulent area above said dam, an upper filter bed above said area through which washed air travels upwardly for removing liquid therefrom and whereby said removed liquid can drain into said dam, and a deflector in said space against which said dust laden air discharge impinges for changing the direction of flow of said air to direct it against the underside of said lower filter bed.

References Cited in the file of this patent

UNITED STATES PATENTS

| Number | Name | Date |
| --- | --- | --- |
| 2,000,444 | Hechenbleikner | May 7, 1935 |
| 2,409,558 | Gunn | Oct. 15, 1946 |
| 2,580,703 | Russell | Jan. 1, 1952 |
| 2,609,062 | Schreier et al. | Sept. 2, 1952 |

FOREIGN PATENTS

| Number | Country | Date |
| --- | --- | --- |
| 41,531 | France | Jan. 28, 1933 |
| 535,422 | Great Britain | Apr. 9, 1941 |
| 544,699 | Great Britain | Apr. 23, 1942 |
| 699,835 | France | Dec. 17, 1930 |